United States Patent
Huang

(10) Patent No.: US 12,261,897 B2
(45) Date of Patent: Mar. 25, 2025

(54) ELECTRONIC DEVICE, WEBCAST INTERACTION SYSTEM AND METHOD, STORAGE MEDIUM, AND PROGRAM PRODUCT

(71) Applicant: CANGLING INTERNET TECHNOLOGY (SHENZHEN) CO., LTD., Shenzhen (CN)

(72) Inventor: Ying Huang, Shenzhen (CN)

(*) Notice: Subject to any disclaimer, the term of this patent is extended or adjusted under 35 U.S.C. 154(b) by 71 days.

(21) Appl. No.: 18/358,286

(22) Filed: Jul. 25, 2023

(65) Prior Publication Data
US 2024/0364765 A1    Oct. 31, 2024

Related U.S. Application Data

(63) Continuation of application No. PCT/CN2023/091150, filed on Apr. 27, 2023.

(51) Int. Cl.
*H04L 65/611* (2022.01)
*H04L 65/65* (2022.01)

(52) U.S. Cl.
CPC ............ *H04L 65/611* (2022.05); *H04L 65/65* (2022.05)

(58) Field of Classification Search
CPC ............................. H04L 65/611; H04L 65/65
USPC ......................................................... 709/231
See application file for complete search history.

(56) References Cited

FOREIGN PATENT DOCUMENTS

| CN | 107509117 A | * | 12/2017 | |
|---|---|---|---|---|
| CN | 113194329 A | | 7/2021 | |
| CN | 115314727 A | * | 11/2022 | ......... H04N 21/2187 |
| CN | 116233513 A | | 6/2023 | |
| KR | 20200041839 A | | 4/2020 | |
| TW | 202132967 A | * | 9/2021 | ............ G06F 3/167 |

* cited by examiner

*Primary Examiner* — Glenford J Madamba
(74) *Attorney, Agent, or Firm* — Nitin Kaushik

(57) ABSTRACT

The present disclosure relates to an electronic device, webcast interaction system and method, a storage medium and a program product. A first motion parameter of a virtual object corresponding to an anchor user is determined according to acquired target feedback data of an audience user on a webcast of the anchor user. Further, the motion of the virtual object on the webcast screen is controlled according to the first motion parameter, to allow a first sensor tool for the anchor user to move with the virtual object.

18 Claims, 7 Drawing Sheets

ELECTRONIC DEVICE, WEBCAST INTERACTION SYSTEM AND METHOD, STORAGE MEDIUM, AND PROGRAM PRODUCT

CROSS REFERENCE TO RELATED APPLICATION

The present application is a continuation application of International Application No. PCT/CN2023/091150, filed on Apr. 27, 2023, entitled "Electronic Device, Webcast Interaction System and Method, Storage Medium, and Program Product", the content of which is herein incorporated by reference in its entirety.

TECHNICAL FIELD

The present disclosure relates to the field of Internet technology, and particularly to an electronic device, a webcast interaction system and method, a storage medium, and a program product.

BACKGROUND

With the development of Internet communication technology, webcast has become a more popular way of social networking.

In related technology, during the webcast process of an anchor user, an audience user may give feedback on the webcast of the anchor user, so that the anchor user can view the feedback information of the audience user. However, in the related techniques, the interaction mode between the anchor user and the audience user is relatively single.

SUMMARY

In view of this, as for the above technical problem, it is necessary to provide an electronic device, webcast interaction system and method, a storage medium, and a program product, in order to address the technical problem in the related technologies that interaction mode between the anchor user and the audience user is relatively single.

In a first aspect of the present disclosure, an electronic device is provided, including: a processor and a memory for storing a computer program, the processor, when executing the computer program, implementing steps of:
  acquiring target feedback data of an audience user on a webcast of an anchor user;
  determining a first motion parameter of a virtual object corresponding to the anchor user according to the target feedback data, the virtual object being displayed on a webcast screen; and
  controlling a motion of the virtual object on the webcast screen according to the first motion parameter, to allow a first sensor tool for the anchor user to move with the virtual object.

In an embodiment, the determining the first motion parameter of the virtual object corresponding to the anchor user according to the target feedback data includes:
  querying the first motion parameter corresponding to the target feedback data in a first operation parameter pool according to the target feedback data, the first operation parameter pool including corresponding relationships between various feedback data and motion parameters.

In an embodiment, the determining the first motion parameter of the virtual object corresponding to the anchor user according to the target feedback data includes:
  determining an algorithm tool based on the target feedback data;
  invoking the algorithm tool to generate an algorithm result; and
  determining the first motion parameter according to the algorithm result.

In an embodiment, the determining the first motion parameter according to the algorithm result includes:
  querying the first motion parameter corresponding to the algorithm result in a second operation parameter pool according to the algorithm result, the second operation parameter pool including corresponding relationships between different algorithm results and motion parameters.

In an embodiment, the determining the first motion parameter according to the algorithm result includes:
  querying a candidate motion parameter corresponding to the target feedback data in the first operation parameter pool according to the target feedback data, the first operation parameter pool including corresponding relationships between various feedback data and the motion parameters; and
  adjusting the candidate motion parameter according to the algorithm result to obtain the first motion parameter.

In an embodiment, the processor, when executing the computer program, further implements the step of:
  displaying the algorithm result on the webcast screen.

In an embodiment, the acquiring the target feedback data of the audience user on the webcast of the anchor user includes:
  acquiring feedback data of a plurality of audience users on the webcast of the anchor user at the same time; and
  superposing the feedback data to obtain the target feedback data.

In an embodiment, the determining the first motion parameter of the virtual object corresponding to the anchor user according to the target feedback data includes:
  when detecting that a superposition result of the feedback data in the feedback data pool satisfies a special mode triggering condition, querying the first motion parameter corresponding to the target feedback data in a third operation parameter pool according to the target feedback data, the feedback data pool storing feedback data of a plurality of audience users on the webcast of the anchor user, the third operation parameter pool including corresponding relationships between various feedback data and motion parameters.

In an embodiment, the processor, when executing the computer program, further implements steps of:
  acquiring a control page request;
  acquiring a control page link according to the control page request; and
  returning the control page link which is configured for a terminal corresponding to the audience user to access a control page corresponding to the first sensor tool.

In an embodiment, the processor, when executing the computer program, further implements steps of:
  receiving an operating instruction triggered by the terminal corresponding to the audience user based on the control page, the operating instruction including a second motion parameter; and
  controlling the motion of the first sensor tool according to the second motion parameter.

In an embodiment, the processor, when executing the computer program, further implements steps of:
  acquiring a rule configuration instruction; and determining an operation parameter pool according to the rule configuration instruction, the operation parameter pool including at least one of a first operation parameter pool, a second operation parameter pool, or a third operation parameter pool.

In an embodiment, the processor, when executing the computer program, further implements steps of:
acquiring a tool binding instruction; and
connecting and binding the first sensor tool to a terminal corresponding to the anchor user according to the tool binding instruction.

In an embodiment, the processor, when executing the computer program, further implements steps of:
acquiring an animation template instruction; and
acquiring an animation template of the virtual object according to the animation template instruction.

In an embodiment, the processor, when executing the computer program, further implements steps of:
controlling an operation of a second sensor tool corresponding to the audience user according to the first motion parameter.

In an embodiment, the target feedback data is feedback scale data determined according to original feedback data of the audience user on the webcast of the anchor user and preset base data.

In a second aspect of the present disclosure, a webcast interaction system is provided, including a first sensor tool for an anchor user and the electronic device of any one of embodiments in the first aspect. The electronic device is configured to:
acquire target feedback data of an audience user on a webcast of an anchor user, and determine a first motion parameter of a virtual object corresponding to the anchor user according to the target feedback data, the virtual object being displayed on a webcast screen; and
control a motion of the virtual object on the webcast screen according to the first motion parameter, to allow a first sensor tool for the anchor user to move with the virtual object.

In a third aspect of the present disclosure, a webcast interaction method is provided, which is applied to the electronic device of any one of the embodiments in the first aspect. The method includes:
acquiring target feedback data of an audience user on a webcast of an anchor user;
determining a first motion parameter of a virtual object corresponding to the anchor user according to the target feedback data, the virtual object being displayed on a webcast screen; and
controlling a motion of the virtual object on the webcast screen according to the first motion parameter, to allow a first sensor tool for the anchor user to move with the virtual object.

In a fourth aspect of the present disclosure, a computer-readable storage medium is provided, on which a computer program is stored. When the computer program is executed by a processor, the steps of any one of the embodiment in the first aspect are implemented.

In a fifth aspect of the present disclosure, a computer program product is provided, which includes a computer program. When the computer program is executed by a processor, the steps of any one of the embodiments in the first aspect are implemented.

With the electronic device, the webcast interaction system and method, the storage medium and the program product, a first motion parameter of a virtual object corresponding to an anchor user is determined according to acquired target feedback data of an audience user on a webcast of the anchor user. Further, the motion of the virtual object on the webcast screen is controlled according to the first motion parameter, to allow the first sensor tool for the anchor user to move with the virtual object. By controlling the motions of the virtual object corresponding to the anchor user and the first sensor tool for the anchor user according to the target feedback data of the audience user on the webcast of the anchor user, the audience user can be informed of response operation corresponding to the target feedback data, thereby improving the interaction between the anchor user and the audience user, and more diversifying the interaction modes between the anchor user and the audience user.

BRIEF DESCRIPTION OF THE DRAWINGS

Various advantages and benefits will become apparent to those of ordinary skill in the art upon reading the following detailed description of the preferred embodiments. The accompanying drawings are merely used for the purpose of illustrating the preferred embodiments and are not to be construed as limiting the present disclosure. Throughout all the drawings, the same reference signs indicate the same parts. In the drawings.

DETAILED DESCRIPTION

Embodiments of the technical solution of the present disclosure will be described in detail in conjunction with the accompanying drawings. The following embodiments are merely used for illustrating more clearly the technical solution of the present disclosure and therefore serve as examples only, and are not intended to limit the scope of protection of the present disclosure.

Unless otherwise defined, all technical and scientific terms used herein have the same meaning as commonly understood by those skilled in the art to which the present disclosure belongs. The terms used herein are for the purpose of describing specific embodiments only and are not intended to limit the present disclosure. The term "comprising" and any variations thereof in the description and claims of the present disclosure and in the foregoing description of the accompanying drawings, is intended to cover the non-exclusive inclusion.

In the description of the embodiments of the present disclosure, the technical terms "first", "second" and the like are used merely for distinguishing different objects and are not construed as indicating or implying relative importance or implying an indication of the number, a particular order, or a primacy-secondary relationship of the technical limitations indicated. In the description of the embodiments of the present disclosure, the term "multiple" means more than two (including two), unless otherwise specifically defined.

The electronic device, the webcast interaction system and method, the storage medium and the program product provided by the embodiments of the present disclosure can be applied to the application scenarios of the webcast interaction, and of course can also be applied to other scenarios.

In related techniques, during the webcast process of an anchor user, an audience user may provide feedback on the webcast of the anchor user. The anchor user may view the feedback information of the audience user, but the audience user may usually only change a skin of a feedback list according to different feedback information. So that in the related techniques, an interaction mode between the anchor user and the audience user is relatively single.

In order to solve the technical problem that the interaction mode in the related techniques is relatively single, the present disclosure in the embodiments provides a technical solution that a virtual object and a motion mode of a first sensor tool corresponding to the anchor user is controlled according to target feedback data of the audience user on the webcast of the anchor user, so that the audience user may be informed of a response operation corresponding to the target feedback data, thereby improving the interaction between the anchor user and the audience user, and accordingly more diversifying the interaction mode between the anchor user and the audience user.

Figure 1:
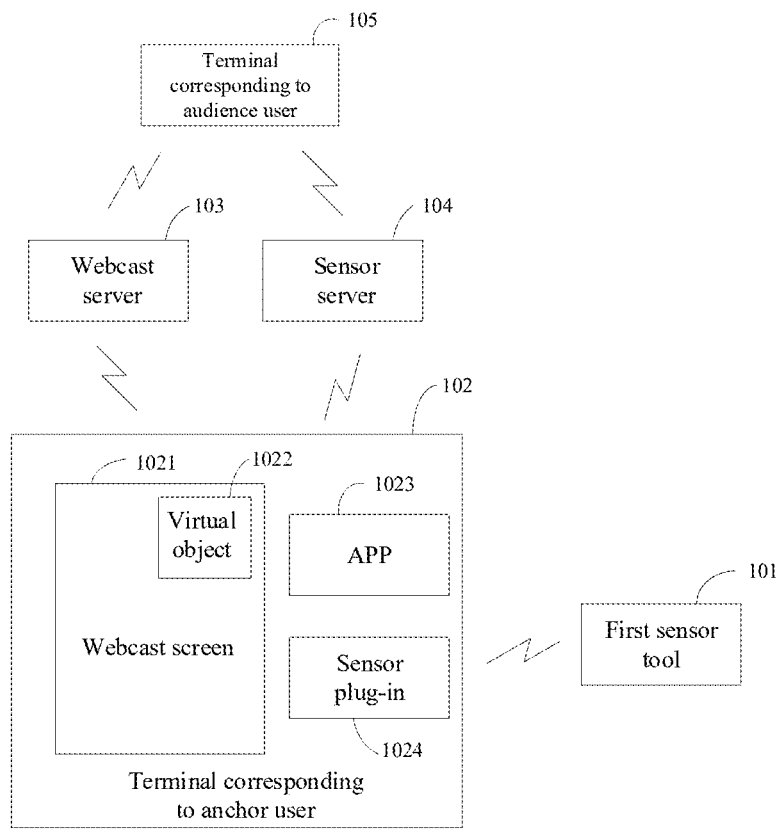
FIG. 1 is a schematic architecture diagram of a webcast interaction system according to an embodiment of the present disclosure.

FIG. 1 is a schematic diagram illustrating an architecture of a webcast interaction system provided by an embodiment of the present disclosure. As shown in FIG. 1, the webcast interaction system in the embodiment of the present disclosure may include, but is not limited to, a first sensor tool 101 for an anchor user, a terminal 102 corresponding to the anchor user, a webcast server 103, a sensor server 104, and a terminal 105 corresponding to an audience user. Of course, the webcast interaction system may further include other devices, such as a second sensor tool for the audience user, etc.

Exemplarily, the terminal 102 corresponding to the anchor user may be connected to the first sensor tool 101 of the anchor user in a wired or wireless mode. The terminal 105 corresponding to the audience user may be connected to the second sensor tool for the audience user in the wired or wireless mode. The wireless mode may include, but is not limited to, wireless network communication technology such as wireless fidelity (Wi-Fi) or Bluetooth.

The terminal 102 corresponding to the anchor user in the embodiment of the present disclosure may display the webcast screen 1021 on which the virtual object 1022 corresponding to the anchor user is further displayed.

It should be noted that the webcast interaction system in the embodiment of the present disclosure may include a plurality of terminals 105 corresponding to a plurality of audience users. However, the terminal 105 corresponding to one audience user is shown in FIG. 1 for the sake of drawing.

In a possible implementation mode, the terminal 102 corresponding to the anchor user may be provided with a sensor application program (APP) 1023 configured to control the first sensor tool 101. The terminal 105 corresponding to the audience user may be provided with a sensor APP configured to control the second sensor tool. It should be appreciated that the sensor server 104 is a server corresponding to the sensor APP.

In another possible implementation mode, the terminal 102 corresponding to the anchor user may further be provided with a sensor plug-in 1024 configured to control the first sensor tool 101 and the virtual object. As an example, the sensor plug-in 1024 may be provided in a browser in the terminal 102 corresponding to the anchor user.

The terminal 102 corresponding to the anchor user or the sensor server 104 in the embodiment of the present disclosure may adopt the webcast interaction method provided in the embodiment of the present disclosure, to more diversify the interaction mode between the anchor user and the audience user.

As an example, the anchor user involved in the embodiments of the present disclosure may include, but is not limited to, a real person user online or a network virtual character user.

As an example, the terminals involved in the embodiments of the present disclosure may include, but are not limited to, various personal computers, laptops, smartphones, and tablets. Any sensing tool involved in the embodiments of the present disclosure may include, but is not limited to, a controllable and movable tool, such as an adult toy, etc. Any server involved in the embodiments of the present disclosure may be implemented as a separate server or a server cluster comprising a plurality of servers.

Figure 2:
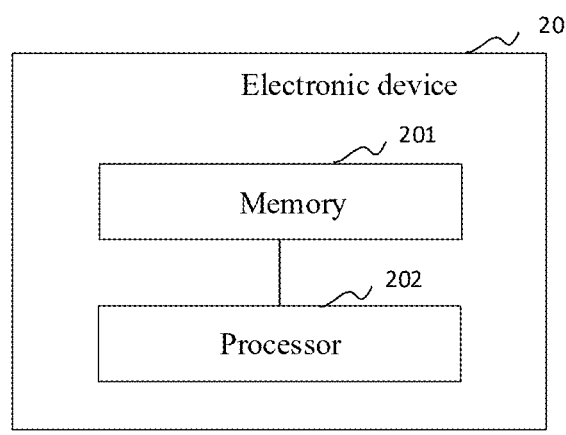
FIG. 2 is a schematic structure diagram of an electronic device according to an embodiment of the present disclosure.
Figure 3:
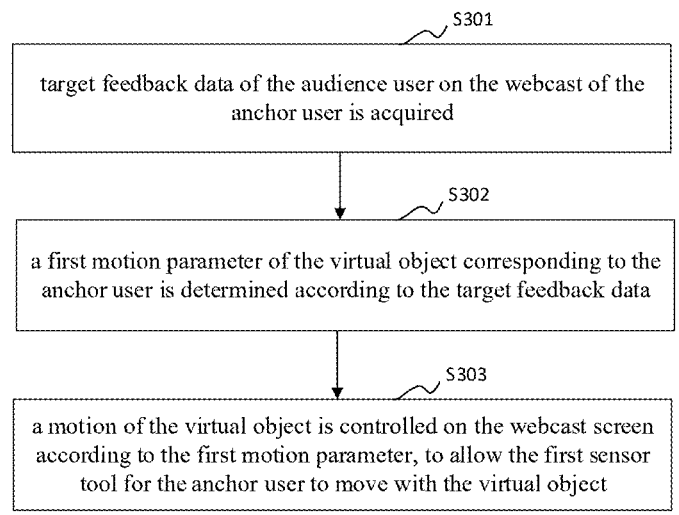
FIG. 3 is a flow chart of a webcast interaction method according to an embodiment of the present disclosure.

In an embodiment, FIG. 2 is a schematic structure diagram of an electronic device in an embodiment of the present disclosure. The electronic device 20 in the present embodiment may be the terminal 102 corresponding to the anchor user in FIG. 1 or the sensor server 104. As shown in FIG. 2, the electronic device 20 in the embodiment of the present disclosure may include, but is not limited to, a memory 201 and a processor 202. FIG. 3 is a flow chart showing a webcast interaction method according to an embodiment of the present disclosure. Referring to FIGS. 2 and 3, the memory 201 stores a computer program, and processor 202 may implement the method as shown in FIG. 3 when executing the computer program.

Step S301: target feedback data of the audience user on the webcast of the anchor user is acquired.

As an example, the target feedback data in the embodiment may be original feedback data of the audience user on the webcast of the anchor user. For example, the original feedback data in the embodiment may include, but is not limited to, cash data, digital currency data, virtual currency data, or credit data.

As another example, the target feedback data in the embodiment of the present disclosure may be feedback data obtained by converting the original feedback data of the audience user on the webcast of the anchor user according to a preset conversion scale. For example, if the original feedback data is A, and the preset conversion scale is 1:1, the target feedback data is A. If the original feedback data is A, and the preset conversion scale is 1:2, the target feedback data is 2A.

As another example, the target feedback data in the embodiment of the present disclosure may be feedback scale data determined according to the original feedback data of the audience user on the webcast of the anchor user and preset base data. For example, if the original feedback data is A, and the preset base data is 2A, the target feedback data may be A/2A, i.e., 0.5 or 50%.

In the step, the electronic device may acquire the target feedback data of the audience user on the webcast of the anchor user. In a possible implementation mode, the electronic device may acquire the target feedback data from the sensor server 104 through an application programming interface (API). Alternatively, the electronic device may acquire the target feedback data through the sensor plug-in in the terminal 102 corresponding to the anchor user. Of course, the electronic device can also acquire the target feedback data through other modes.

Step S302: a first motion parameter of the virtual object corresponding to the anchor user is determined according to the target feedback data.

As an example, any motion parameter in the embodiments of the present disclosure may be configured to indicate a motion mode of the virtual object and/or a motion mode of the sensor tool. For example, the motion parameter may include, but is not limited to, at least one of: a motion mode, a motion duration, a motion frequency, or a motion intensity. The motion mode may include, but is not limited to, at least one of: a vibration, a rotation, a push, or an oscillation.

In the step, the electronic device may determine the first motion parameter of the virtual object corresponding to the anchor user according to the target feedback data. The virtual object is displayed on the webcast screen. It should be appreciated that the virtual object may be displayed in a first preset area on the webcast screen such that the webcast screen corresponding to the anchor user is not obscured by the virtual object.

In a possible implementation mode, the electronic device may determine the first motion parameter corresponding to the target feedback data according to the target feedback data and a preset matching rule. The preset matching rule is configured to indicate a corresponding relationship between the target feedback data and the first motion parameter.

In another possible implementation mode, the electronic device may invoke a corresponding algorithmic tool according to the target feedback data, and determine the first motion parameter according to an algorithm result of the algorithm tool. As an example, the algorithmic tool may include, but not limited to, a game algorithmic tool or other preset algorithmic tools.

Of course, the electronic device may further determine the first motion parameter according to the target feedback data in combination with the preset matching rule and the algorithmic tool.

Step S303: a motion of the virtual object is controlled on the webcast screen according to the first motion parameter, to allow the first sensor tool for the anchor user to move with the virtual object.

In the step, the electronic device may control the virtual object to move on the webcast screen according to the first motion parameter, such that the first sensor tool for the anchor user may move with the virtual object, and consequently the audience user may be informed of the response operation corresponding to the target feedback data on the webcast of the anchor user, thereby improving the interaction between the anchor user and the audience user.

It should be appreciated that the first sensor tool may have the same motion mode as the virtual object; or the motion mode of the first sensor tool corresponds to the motion mode of the virtual object. For example, if the motion mode of the virtual object is a rotation mode, the motion mode of the first sensor tool may be the rotation mode. If the motion mode of the virtual object is jumping up and down, the motion mode of the first sensor tool may be the vibration mode.

In the following embodiments of the present disclosure, the step of controlling the virtual object to move on the webcast screen according to the first motion parameter is detailed below.

As an example, in the case where the electronic device is the sensor server, the electronic device may transmit the first motion parameter to the terminal corresponding to the anchor user, such that the terminal corresponding to the anchor user controls the virtual object to move on the webcast screen according to the first motion parameter.

As another example, in the case where the electronic device is the terminal corresponding to the anchor user, the electronic device may control the virtual object to move on the webcast screen according to the first motion parameter.

As another example, the electronic device may transmit the first motion parameter to the webcast server, such that the webcast server 103 controls the virtual object to move on the webcast screen according to the first motion parameter.

Of course, the electronic device may also control the virtual object to move on the webcast screen according to the first motion parameter in other ways.

In the following embodiments of the present disclosure, the step of allowing the first sensor tool for the anchor user to move with the virtual object is detailed below.

In a possible implementation mode, in the case where the electronic device is the terminal corresponding to the anchor user, the electronic device, when detecting the motion of the virtual object, may transmit a motion instruction carrying a pursuit motion parameter to the first sensor tool for the anchor user, so that the first sensor tool can move according to the pursuit motion parameter, and accordingly the first sensor tool moves with the virtual object.

As an example, the pursuit motion parameter may be the same as or correspond to the first motion parameter. For example, if the motion mode in the first motion parameter is the rotation mode, the motion mode in the pursuit motion parameter may be the rotation mode. If the motion mode in the first motion parameter is jumping up and down, the motion mode in the pursuit motion parameter may be the vibration mode.

In another possible implementation mode, in the case where the electronic device is the sensor server, the electronic device may transmit the pursuit motion parameter to the terminal corresponding to the anchor user, to allow the terminal corresponding to the anchor user to transmit the pursuit motion parameter to the first sensor tool for the anchor user, in order to facilitate the first sensor tool to move in accordance with the pursuit motion parameter, thereby allowing the first sensor tool to move with the virtual object.

In another possible implementation mode, the first sensor tool corresponding to the anchor user, when detecting the motion of the virtual object on the webcast screen of the terminal corresponding to the anchor user, may move with the virtual object according to the detected motion parameter, thereby driving the first sensor tool to move with the virtual object. A distance between the first sensor tool corresponding to the anchor user and the terminal corresponding to the anchor user is less than a preset distance, so that the first sensor tool can detect whether the virtual object moves on the webcast screen of the terminal corresponding to the anchor user.

As an example, the first sensor tool may be provided with an image acquisition module and an image processing module. The image acquisition module may acquire image information of the virtual object on the webcast screen of the terminal corresponding to the anchor user; and the image processing module may detect whether the virtual object moves on the webcast screen according to the image information acquired by the image acquisition module. Of course, the first sensor tool can also detect whether the virtual object moves on the webcast screen through other modes.

Of course, the first sensor tool for the anchor user may be allowed to move with the virtual object through other modes in the embodiments of the present disclosure.

In the embodiments of the present disclosure, the first motion parameter of the virtual object corresponding to the anchor user is determined according to the acquired target feedback data of the audience user on the webcast of the anchor user. Further, the virtual object is controlled to move on the webcast screen according to the first motion parameter, to allow the first sensor tool for the anchor user to move with the virtual object. Accordingly, the motions of the virtual object corresponding to the anchor user and the first sensor tool for the anchor user are controlled according to the target feedback data of the audience user on the webcast of the anchor user, so that the audience user may be informed of the response operation corresponding to the target feedback data, thereby improving the interaction between the anchor user and the audience user, and accordingly more diversifying the interaction mode between the anchor user and the audience user.

Furthermore, in the case where the webcast interaction system may further include a second sensor tool for the audience user according to an embodiment of the present disclosure, the electronic device may further control an operation of the second sensor tool corresponding to the audience user according to the first motion parameter, which further improves the interaction between the anchor user and the audience user.

As an example, in the case where the electronic device is the sensor server, the electronic device may transmit the first motion parameter to the terminal corresponding to the audience user, such that the terminal corresponding to the audience user may transmit the first motion parameter to the second sensor tool for the audience user, to control the operation of the second sensor tool corresponding to the audience user.

As another example, in the case where the electronic device is the terminal corresponding to the anchor user, the electronic device may transmit the first motion parameter to the sensor server, such that the sensor server transmits the first motion parameter to the second sensor tool for the audience user by means of the terminal corresponding to the audience user, in order to control the operation of the second sensor tool corresponding to the audience user.

Of course, the electronic device may control the operation of the second sensor tool corresponding to the audience user according to the first motion parameter through other modes.

In an embodiment, based on the above embodiments, the step of "determining the first motion parameter of the virtual object corresponding to the anchor user according to the target feedback data" in the above step S302 will be detailed in an embodiment of the present disclosure in a possible implementation mode. The above step S302 in an embodiment of the present disclosure may further include:

the first motion parameter corresponding to the target feedback data is queried in a first operation parameter pool according to the target feedback data, in which the first operation parameter pool may include corresponding relationships between various feedback data and motion parameters.

It should be appreciated that any operation parameter pool involved in the embodiments of the present disclosure may be a preset fixed operation parameter pool, or may be a variable operation parameter pool which is preset by the anchor user or an administrative user through a rule configuration instruction.

As an example, the first operation parameter pool may include, but is not limited to, corresponding relationships between a plurality of pieces of feedback data and a plurality of motion parameters. Any feedback data may correspond to one motion parameter, or may correspond to a plurality of motion parameters, and any feedback data may refer to one set of data. It should be noted that the motion parameter involved in the embodiments of the present disclosure may refer to a set of motion parameters, and the set of motion parameters may refer to have one type of motion pattern, one type of motion frequency, and/or one type of motion intensity.

For example, the first operation parameter pool may include a corresponding relationship between the feedback data 1 and the motion parameter 1, a corresponding relationship between the feedback data 2 and the motion parameter 2, and a corresponding relationship between the feedback data 3 and the motion parameter 3.

For another example, the first operation parameter pool may include a corresponding relationship between the feedback data 1 and the motion parameter 1, a corresponding relationship between the feedback data 1 and the motion parameter 2, a corresponding relationship between the feedback data 1 and the motion parameter 3, a corresponding relationship between the feedback data 2 and the motion parameter 4, and a corresponding relationship between the feedback data 2 and the motion parameter 5.

For another example, the first operation parameter pool may include, but is not limited to, corresponding relationships between a plurality of pieces of feedback data and a plurality of motion parameters. Any feedback data may correspond to one motion parameter, or may correspond to a plurality of motion parameters. and any feedback data may refer to a set of feedback data, e.g., a plurality of feedback data within a preset range.

For example, the first operation parameter pool may include a corresponding relationship between the feedback data 1' and the motion parameter 1, a corresponding relationship between the feedback data 2' and the motion parameter 2, and a corresponding relationship between the feedback data 3' and the motion parameter 3, in which the feedback data 1', the feedback data 2' and the feedback data 3' are three sets of feedback data in three different ranges.

For another example, the first operation parameter pool may include a corresponding relationship between the feedback data 1' and the motion parameter 1, a corresponding relationship between the feedback data 1' and the motion parameter 2, a corresponding relationship between the feedback data 1' and the motion parameter 3, a corresponding relationship between the feedback data 2' and the motion parameter 4, and a corresponding relationship between the feedback data 2' and the motion parameter 5.

In the embodiment of the present disclosure, the electronic device may determine a motion parameter corresponding to the target feedback data in the first operation parameter pool as a first motion parameter according to the target feedback data. It should be appreciated that the first motion parameter may be one motion parameter or a plurality of motion parameters.

As an example, in the case where the first motion parameter includes a plurality of motion parameters, the electronic device may sequentially control the virtual object to move on the webcast screen according to the plurality of motion parameters in the first motion parameter, such that the first sensor tool for the anchor user moves with the virtual object.

As another example, in the case where the first motion parameter includes a plurality of motion parameters, the electronic device may select at least one motion parameter from the plurality of motion parameters in the first motion parameter according to a preset algorithm to control the virtual object to move on the webcast screen, such that the first sensor tool for the anchor user moves with the virtual object. The preset algorithm may include, but is not limited to, a random selection algorithm.

In the embodiments of the present disclosure, the electronic device queries the first motion parameter corresponding to the target feedback data from the first operation parameter pool according to the target feedback data, in order to control the virtual object to move on the webcast screen according to the first motion parameter, so that the first sensor tool for the anchor user moves with the virtual object. Since the first operation parameter pool includes corresponding relationships between various feedback data and motion parameters, different target feedback data in the embodiment of the present disclosure corresponds to a different first motion parameter, so that the motion modes of the virtual object corresponding to the anchor user and the first sensor tool for the anchor user are more diversified, thereby further enriching the interaction modes between the anchor user and the audience user.

Figure 4:
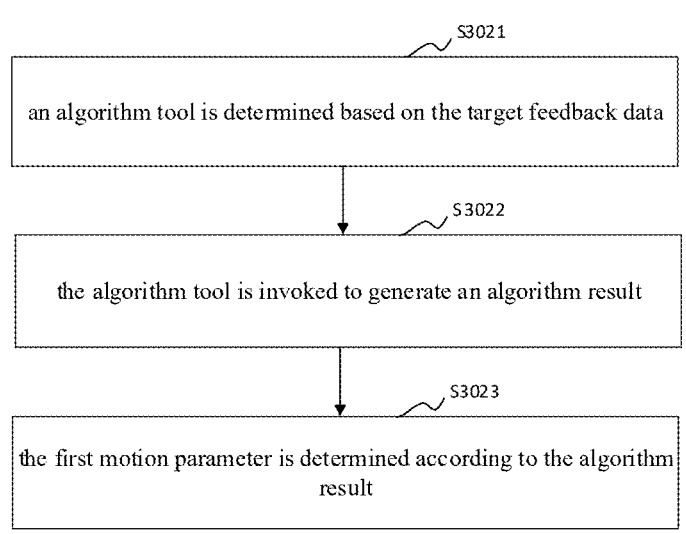
FIG. 4 is a flow chart of a webcast interaction method according to another embodiment of the present disclosure.

In an embodiment, FIG. 4, is a flow chart of a webcast interaction method. Based on the above embodiment, another possible implementation mode of the step of "determining the first motion parameter of the virtual object corresponding to the anchor user according to the target feedback data" in the above step S302 will be detailed. As shown in FIG. 4, the above step S302 in the embodiment of the present disclosure may include following steps.

Step S3021: an algorithm tool is determined based on the target feedback data.

In this step, the electronic device may determine a corresponding algorithm tool according to the target feedback data; the algorithm tool may include, but is not limited to, a game algorithm tool or other preset algorithm tools.

As an example, different target feedback data may correspond to the same algorithm tool, or different target feedback data may correspond to different algorithm tools; the larger the target feedback data, the more variety of algorithm results of the corresponding algorithm tool.

Step S3022: the algorithm tool is invoked to generate an algorithm result.

In this step, the electronic device may invoke the algorithm tool determined in the step S3021 above to generate the algorithm result.

As an example, during the invocation of the algorithm tool, the electronic device may further display a screen corresponding to the algorithm tool on the webcast screen so that the audience user may be informed of the response stage corresponding to the target feedback data. It should be appreciated that the screen corresponding to the algorithm tool can be stacked on the user webcast screen corresponding to the anchor user; or the screen corresponding to the algorithm tool can be displayed in a second preset area on the webcast screen corresponding to the anchor user, so that the webcast screen corresponding to the anchor user is not obscured.

Furthermore, the electronic device can also display the algorithm result on the webcast screen, so that the audience user be informed of the algorithm result, which is beneficial to improving the participation degree of the audience user. As for the display mode of the algorithm result, reference can be made to the display mode of the screen corresponding to the algorithm tool, which is not repeated here.

Step S3023: the first motion parameter is determined according to the algorithm result.

In this step, the electronic device may determine the first motion parameter of the virtual object corresponding to the anchor user according to the algorithm result.

In a possible implementation mode, a first motion parameter corresponding to the algorithm result is queried in a second operation parameter pool according to the algorithm result; the second operation parameter pool includes corresponding relationships between various algorithm results and motion parameters.

As an example, the second operation parameter pool may include, but is not limited to, corresponding relationships between a plurality of algorithm results and motion parameters. Any algorithm result may correspond to one motion parameter, or may correspond to a plurality of motion parameters; and any algorithm result may refer to one result.

For example, the second operation parameter pool may include a corresponding relationship between the algorithm result 1 and motion parameter 1, a corresponding relationship between the algorithm result 2 and motion parameter 2, and a corresponding relationship between the algorithm result 3 and motion parameter 3.

For another example, the second operation parameter pool may include a corresponding relationship between the algorithm result 1 and the motion parameter 1, a corresponding relationship between the algorithm result 1 and the motion parameter 2, a corresponding relationship between the algorithm result 1 and the motion parameter 3, a corresponding relationship between the algorithm result 2 and the motion parameter 4, and a corresponding relationship between the algorithm result 2 and the motion parameter 5.

For another example, the second operation parameter pool may include, but is not limited to, corresponding relationships between a plurality of algorithm results and motion parameters. Any algorithm result may correspond to one motion parameter, or may correspond to a plurality of motion parameters; and any algorithm result may refer to a set of algorithm results consisting of a plurality of results.

For example, the second operation parameter pool may include a corresponding relationship between the algorithm result 1' and the motion parameter 1, a corresponding relationship between the algorithm result 2' and the motion parameter 2, and a corresponding relationship between the algorithm result 3' and the motion parameter 3. The algorithm result 1', the algorithm result 2' and the algorithm result 3' are three different sets of algorithm results respectively.

Another example, the second operation parameter pool may include a corresponding relationship between the algorithm result 1' and the motion parameter 1, a corresponding relationship between the algorithm result 1' and the motion parameter 2, a corresponding relationship between the algorithm result 1' and the motion parameter 3, a corresponding relationship between the algorithm result 2' and the motion parameter 4, and a corresponding relationship between the algorithm result 2' and the motion parameter 5.

In this implementation mode, the electronic device may determine the motion parameter corresponding to the algorithm result in the second operation parameter pool as the first motion parameter according to the algorithm result generated in the step S3022. It should be appreciated that the first motion parameter may be one motion parameter or a plurality of motion parameters.

In this implementation mode, the first motion parameter is determined according to the algorithm result. Since the second operation parameter pool includes corresponding relationships between various algorithm results and motion parameters, different algorithm results in the embodiment of the present disclosure correspond to different first motion parameters, so that the motion modes of the virtual object corresponding to the anchor user and the first sensor tool for the anchor user are more diversified, thereby further enriching the interaction modes between the anchor user and the audience user.

In another possible implementation mode, a candidate motion parameter corresponding to the target feedback data is queried in the first operation parameter pool according to the target feedback data; the first operation parameter pool includes correspondences between various feedback data various feedback data and the motion parameters. The candidate motion parameter is adjusted according to the algorithm result to obtain the first motion parameter.

It should be appreciated that as for the implementable mode of querying the candidate motion parameter corresponding to the target feedback data in the first operation parameter pool according to the target feedback data, reference can be made to the above content of "querying the first motion parameter corresponding to the target feedback data in the first operation parameter pool according to the target feedback data" in the above embodiment, which is not repeated herein.

In the implementation mode, the electronic device adjusts the candidate motion parameter according to the algorithm result to obtain the first motion parameter.

For example, the electronic device may query a relationship between a preset result and an adjustment coefficient according to the algorithm result, and determine a target adjustment coefficient corresponding to the algorithm result, and adjust the candidate motion parameter according to the target adjustment coefficient, to obtain the first motion parameter. The relationship between the preset result and the adjustment coefficient is configured to indicate a corresponding relationship between a different algorithm result and a corresponding adjustment coefficient.

For another example, the electronic device may query an adjustment motion parameter corresponding to the algorithm result in the second operation parameter pool according to the algorithm result. Further, the electronic device may adjust the candidate motion parameter according to the adjustment motion parameter to obtain the first motion parameter. The adjustment process may include, but is not limited to, a superposition processing or a maximum value processing.

It should be appreciated that as for the implementable mode in which the electronic device queries the adjustment motion parameter corresponding to the algorithm result in the second operation parameter pool according to the algorithm result, reference can be made to the content of "querying the first motion parameter corresponding to the algorithm result in the second operation parameter pool according to the algorithm result" in the above embodiment, which will not be repeated herein.

In the implementation mode, the candidate motion parameter is queried in the first operation parameter pool according to the target feedback data and is adjusted to determine the first operation parameter, thereby improving the diversity of the first motion parameters, so that the motion modes of the virtual object corresponding to the anchor users and the first sensor tool for the anchor user are more diversified, thereby further enriching the interaction modes between the anchor user and the audience user.

In the embodiment of the present disclosure, the algorithm tool determined based on the target feedback data is invoked to generate the algorithm result, and the first motion parameter is determined according to the algorithm result, in order to control the virtual object to move on the webcast screen according to the first motion parameter, so that the first sensor tool for the anchor user moves with the virtual object. Since the first motion parameter is determined according to the algorithm result on the basis of the target feedback data, the diversity of the first motion parameters can be increased, so that the motion modes of the virtual object corresponding to the anchor user and the first sensor tool for the anchor user are more diversified, and the interaction modes between the anchor user and the audience user are further enriched.

In an embodiment, based on the above embodiment, another possible implementation mode of "determining a first operating parameter of the first sensor tool for the anchor user and the first motion parameter of the virtual object corresponding to the anchor user according to the target feedback data" in the above step S302 will be detailed in the embodiments of the present disclosure in the case where the webcast is in a special mode. In the embodiment of the present disclosure, the above step S302 may include:

when it is detected that a superposition result of the feedback data in the feedback data pool satisfies a special mode triggering condition, the first motion parameter corresponding to the target feedback data is queried in a third operation parameter pool according to the target feedback data; the feedback data pool stores feedback data of a plurality of audience users on the webcast of the anchor user; and the third operation parameter pool may include corresponding relationships between various feedback data and motion parameters.

The special mode in the embodiment of the present disclosure refers to that the electronic device may store feedback data of a plurality of audience users on the webcast of the anchor user in the feedback data pool, and in the case that the superposition result of the feedback data in the feedback data pool satisfies the special mode triggering condition, the electronic device may query in the third operation parameter pool instead of querying in the first operation parameter pool. The feedback data pool stores feedback data of a plurality of audience users on the webcast of the anchor user; and the special mode triggering condition may include, but is not limited to, the superposition result is greater than a first preset superposition threshold, or a change rate of the superposition result is greater than a preset rate threshold.

It should be appreciated that as for the implementation mode of the third operation parameter pool, reference can be made to the content of "first operation parameter pool" in the above-mentioned embodiment, which will not be repeated herein. It should be noted that the diversity of the motion parameters in the third operation parameter pool is greater than the diversity of the motion parameters in the first operation parameter pool, the intensity level of the motion parameters in the third operation parameter pool is greater than the intensity level of the motion parameters in the first operation parameter pool, and/or the duration level of the motion parameters in the third operation parameter pool is greater than the duration level of the motion parameters in the first operation parameter pool.

In the embodiment of the present disclosure, in the case where the electronic device detects that the superposition result of the feedback data in the feedback data pool satisfies the special mode triggering condition, the motion parameter in the third operation parameter pool corresponding to the target feedback data can be determined as the first motion parameter according to the target feedback data.

As an example, in the case where the superposition result satisfies the special mode triggering condition, on the one hand, the electronic device can display a special mode triggering screen on the webcast screen, so that the audience user may be informed of the response stage corresponding to the target feedback data; on the other hand, the electronic device can also display a countdown on the webcast screen, so that audience user may be informed of remaining effective time corresponding to the special mode.

In addition, in the case where the electronic device queries the first motion parameter corresponding to the target feedback data in the third operation parameter pool according to the target feedback data, the electronic device can also superpose and update the feedback data in the feedback data pool according to the target feedback data, for example, the update is performed by subtracting the target feedback data from the superposition result of the feedback data in the feedback data pool.

In the embodiment of the present disclosure, when it is detected that the superposition result of the feedback data in the feedback data pool satisfies the special mode triggering condition, the first motion parameter corresponding to the target feedback data can be queried in the third operation parameter pool according to the target feedback data, in order to control the virtual object to move on the webcast screen according to the first motion parameter, to allow the first sensor tool for the anchor user to move with the virtual object. In the embodiment of the present disclosure, the first motion parameter corresponding to the target feedback data can be queried from different operation parameter pools by combining the feedback data of other audience users, in order to improve the diversity, intensity level and/or duration level of the motion of the virtual object and the motion of the first sensor tool, which is beneficial to improving the feedback efficiency of the audience user on the webcast of the anchor user.

Figure 5:
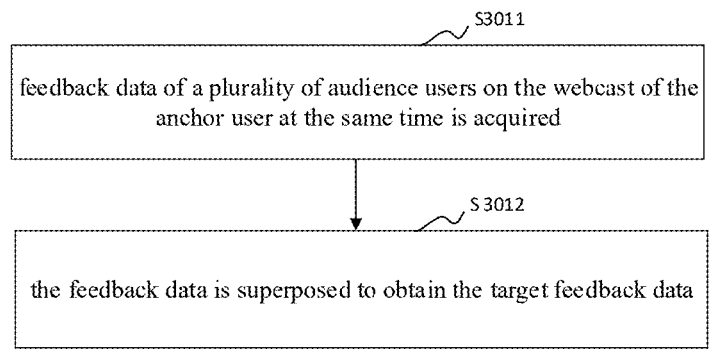
FIG. 5 is a flow chart of a webcast interaction method according to another embodiment of the present disclosure.

Considering that there may be a plurality of audience users giving feedback to the webcast of the anchor user at the same time, in an embodiment, as shown in FIG. 5 which shows a flow chart of a webcast interaction method. Based on the above-mentioned embodiment, a possible implementation mode of "acquiring the target feedback data of the audience user on the webcast of the anchor user" in the above step S301 will be detailed in the embodiment. As shown in FIG. 5, the above-mentioned step S301 in the embodiment of the present disclosure may include following steps.

Step S3011: feedback data of a plurality of audience users on the webcast of the anchor user at the same time is acquired.

In this step, the electronic device can acquire feedback data of a plurality of audience users on the webcast of the anchor user at the same time.

In a possible implementation mode, in the case where there exists a plurality of audience users giving feedback on the webcast of the anchor user at the same time, the electronic device may sort the feedback data of the plurality of audience users on the webcast of the anchor user according to a time sequence, or can sort the feedback data of the plurality of audience users on the webcast of the anchor user according to an order of the feedback data from large to small, in order to control the operation of the first sensor tool and the motion of the virtual object on the webcast screen according to the feedback data in sequence.

It should be appreciated that in the case where the feedback data of the audience users is sorted, the electronic device can display current sorting information on the webcast screen, such as a total number of sorts and a sorting position, etc.

In another possible implementation mode, the electronic device can superpose the feedback data of the plurality of audience users on the webcast of the anchor user at the same time, to uniformly control the operation of the first sensor tool and the motion of the virtual object on the webcast screen according to the superposed data.

As an example, in the case where the superposition result of the feedback data sorted at the same time is greater than a second preset superposition threshold, or the number of audience users sorted is greater than a preset number threshold, the electronic device superposes the feedback data of the plurality of audience users on the webcast of the anchor user at the same time, in order to uniformly control the operation of the first sensor tool and the movement of the virtual object on the webcast screen according to the superposed data.

Step S3012: the feedback data is superposed to obtain the target feedback data.

In this step, the electronic device can superpose the feedback data of a plurality of audience users on the webcast of the anchor user at the same time to obtain the target feedback data, so that the first operating parameter of the first sensor tool for the anchor user and the first motion parameter of the virtual object corresponding to the anchor user can be uniformly determined according to the target feedback data, thereby controlling the operation of the first sensor tool according to the first operating parameter and controlling the motion of the virtual object on the webcast screen according to the first motion parameter.

In the embodiment of the present disclosure, the feedback data of the plurality of audience users on the webcast of the anchor user at the same time is acquired, and the feedback data is superposed to obtain the target feedback data, so that the virtual object corresponding to the anchor user can be controlled to move on the webcast screen according to the target feedback data, to allow the first sensor tool for the anchor user to move with the virtual object. In the embodiment of the present disclosure, by superposing the feedback data of the plurality of audience users on the webcast of the anchor user at the same time, larger target feedback data can be obtained to improve the diversity, intensity level and/or duration level of the motion of the virtual object and the motion of the first sensor tool, which is beneficial to improving the feedback efficiency of the audience user on the webcast of the anchor user.

Figure 6:
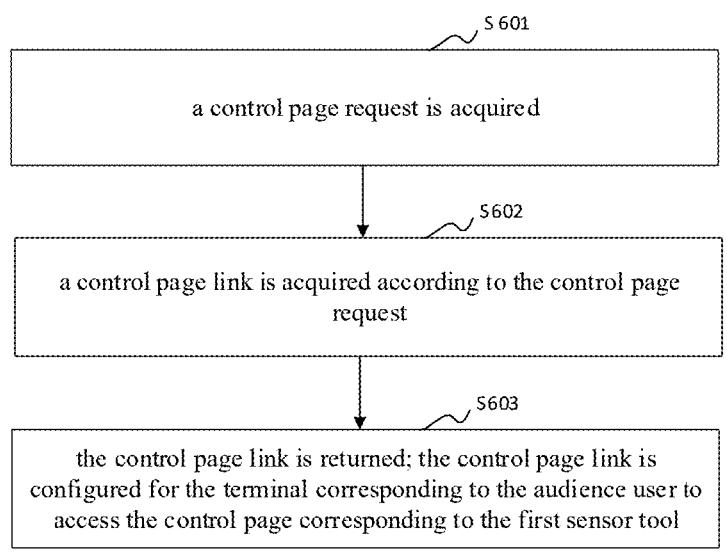
FIG. 6 is a flow chart of a webcast interaction method according to another embodiment of the present disclosure.

Considering that there may exist a situation during the webcast in which the anchor user webcasts for one audience user, in order to further improve the interaction between the audience user and the anchor user, in an embodiment, FIG. 6 is a flow chart of a webcast interaction method. On the basis of the above embodiment, the implementable mode of acquiring a control page link is detailed in the embodiment of the present disclosure. As shown in FIG. 6, the method in the embodiment of the present disclosure may further include following steps.

Step S601: a control page request is acquired.

In the step, the electronic device can acquire a control page request. The control page request is configured to request a control page link, and the control page link is configured to allow a terminal corresponding to an audience user to access a control page corresponding to the first sensor tool for the anchor user, to control the motion of the first sensor tool corresponding to the anchor user.

As an example, in the case where the electronic device is the terminal corresponding to the anchor user, the electronic device may receive the control page request inputted by the anchor user via a touch button of the terminal or voice, etc. Of course, there exists other modes to input the control page request.

As another example, in the case where the electronic device is the sensor server, the electronic device may receive a control page request transmitted by the terminal corresponding to the anchor user. The control page request may be a request inputted by the anchor user through a touch button of the terminal or a voice or the like.

Step S602: a control page link is acquired according to the control page request.

As an example, in the case where the electronic device is the terminal corresponding to the anchor user, the electronic device may query a matching page link from a plurality of page links stored as the control page link, or may transmit the control page request to the sensor server such that the sensor server returns the control page link.

As another example, in the case where the electronic device is the sensor server, the sensor server may generate the control page link based on a preset link generation algorithm according to the control page request, or may query a matching page link from a plurality of page links stored as the control page link.

Of course, the electronic device may also acquire the control page link through other modes.

Step S603: the control page link is returned. The control page link is configured for the terminal corresponding to the audience user to access the control page corresponding to the first sensor tool.

In the step, the electronic device can return the control page link so that the terminal corresponding to the audience user can access the control page corresponding to the first sensor tool for the anchor user through the control page link, in order to control the motion of the first sensor tool corresponding to the anchor user.

Alternatively, the control page may include a plurality of operating components that may control the first sensor tool. The control page may include, but is not limited to, at least one of the following operating components: a motion mode operating component, a duration operating component, a motion frequency operating component, and/or a motion intensity operating component. The terminal corresponding to the audience user can select a motion mode via the motion mode operating component, select the duration via the duration operating component, select the number of motions via the motion frequency operating component, and/or select the motion intensity via the motion intensity operating component.

As an example, in the case where the electronic device is the terminal corresponding to the anchor user, the electronic device may return the control page link to the terminal corresponding to the audience user.

As another example, in the case where the electronic device is the sensor server, the electronic device may return the control page link to the terminal corresponding to the anchor user such that the terminal corresponding to the anchor user returns the control page link to the terminal corresponding to the audience user.

Furthermore, the electronic device can also receive an operating instruction triggered by the terminal corresponding to the audience user based on the control page; the operating instruction may include the second motion parameter.

In an embodiment of the present disclosure, the terminal corresponding to the audience user may select the corresponding second motion parameter based on the plurality of operating components in the control page, and may transmit the operating instruction to the electronic device by clicking on a remote control component. The operating instruction may include, but is not limited to, the second motion parameter.

Furthermore, the electronic device may control the motion of the first sensor tool according to the second motion parameter.

As an example, in the case where the electronic device is the sensor server, the electronic device may transmit the second operating parameter to the terminal corresponding to the anchor user to cause the terminal corresponding to the anchor user to transmit the second operating parameter to the first sensor tool for the anchor user, in order to control the operation of the first sensor tool corresponding to the anchor user.

As another example, in the case where the electronic device is the terminal corresponding to the anchor user, the electronic device may transmit the second operating parameters to the first sensor tool for the anchor user, in order to control the operation of the first sensor tool corresponding to the anchor user.

Of course, the electronic device may also control the operation of the first sensor tool corresponding to the anchor user according to the second operating parameter in other ways.

In the embodiment of the present disclosure, the control page link is acquired according to the control page request, and the control page link is returned. The control page link is configured for the terminal of the audience user to access the control page corresponding to the first sensor tool, so that the terminal corresponding to the audience user can access the control page corresponding to the first sensor tool through the control page link, in order to control the motion of the first sensor tool corresponding to the anchor user, thereby improving the interaction between the anchor user and the audience user, and further diversifying the interaction modes between the anchor user and the audience user.

In an embodiment, based on the above-mentioned embodiments, configuration modes of various operating parameter pools will be detailed bellow in the embodiments of the present disclosure.

In an embodiment of the present disclosure, the electronic device may acquire the rule configuration instruction. The rule configuration instruction may be triggered by the terminal corresponding to the anchor user based on the rule configuration page, or triggered by other devices. The rule configuration instruction may include, but is not limited to, a corresponding relationship between the feedback data and the motion parameter, and/or a corresponding relationship between the algorithm result and the motion parameter. As an example, the rule configuration page may include, but is not limited to, a first configuration component configured to provide a corresponding relationship between feedback data and a motion parameter, and/or a second configuration component configured to provide a corresponding relationship between an algorithm result and a motion parameter. It should be appreciated that any configuration component involved in the embodiments of the present disclosure is a generic term that may include one or more components.

Further, the electronic device can determine the operation parameter pool according to the acquired rule configuration instruction, in order to query the first motion parameter of the virtual object corresponding to the anchor user in the corresponding operation parameter pool. The operation parameter pool may include, but is not limited to, at least one of: a first operation parameter pool, a second operation parameter pool, and a third operation parameter pool.

Based on the above-mentioned embodiments, a binding mode of the first sensor tool and the terminal corresponding to the anchor user will be detailed in an embodiment of the present disclosure.

In an embodiment of the present disclosure, the electronic device may acquire a tool binding instruction. The tool binding instruction can be triggered by the terminal corresponding to the anchor user based on the tool binding page or by other devices. The tool binding instruction may include, but is not limited to, identification information of the first sensor tool and identification information of the terminal corresponding to the anchor user. As an example, the tool binding page may include, but is not limited to, a component configured to select a sensor tool to be bound.

Furthermore, the electronic device can connect and bind the first sensor tool to the terminal corresponding to the anchor user according to the tool binding instruction, so that the terminal corresponding to the anchor user can control the first sensor tool.

In an embodiment, the configuration mode of the virtual object will be detailed below based on the above-mentioned embodiment.

In an embodiment of the present disclosure, the electronic device may acquire an animation template instruction. The animation template instruction may be triggered by the terminal corresponding to the anchor user based on an animation template configuration page or by other devices. The animation template instruction may include, but is not limited to, identification information, quantity information, and/or description information of the animation template of the virtual object. The identification information may include, but is not limited to, text identification and/or image identification of the animation template. The description information may be configured to indicate text description information, action description information, and/or sound description information of the animation template, and the like. As an example, the animation template configuration page may include, but is not limited to, a third configuration component configured to provide identification information for the animation template, a fourth configuration component configured to provide quantity information for the animation template, and/or a fifth configuration component configured to provide description information for the animation template.

Furthermore, the electronic device may acquire the animation template of the virtual object according to the animation template instruction, in order to display the virtual object on the webcast screen. At least one virtual object may be displayed on the webcast screen.

As an example, in the case where the electronic device acquires the animation template of the virtual object, an animation template address may be generated so that the virtual object may be displayed on the webcast screen by setting the animation template address at a preset position. Of course, the virtual object may be displayed in other ways.

It should be appreciated that the virtual object in the embodiments of the present disclosure may be set up and changed by the anchor user via a browser plug-in, a browser, or an APP, etc., Alternatively, a desired virtual object may be selected. The actions of the virtual object may not be limited to a fixed mode, but may also be updated automatically, or the user may expand the action content through a design mode, etc. In addition, a dialogue text of the virtual object is not limited to a fixed mode, but can also be updated automatically, or the user can expand the text content through an input mode.

Figure 7:
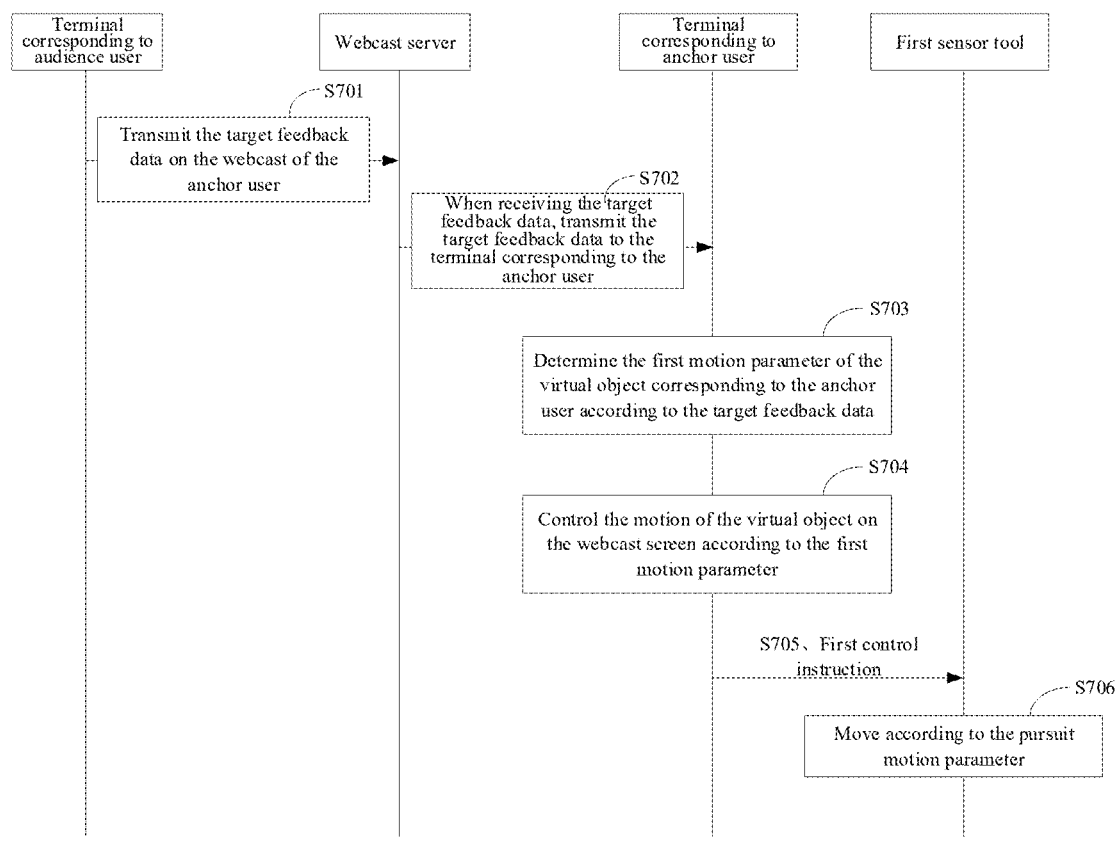
FIG. 7 is a flow chart of a webcast interaction method according to another embodiment of the present disclosure.

In an embodiment, FIG. 7 is a flow chart of a webcast interaction method. Based on the above embodiment, the webcast interaction method is elaborated in an embodiment of the present disclosure in combination with the terminal side corresponding to the audience user, the webcast server side, the terminal side corresponding to the anchor user, and the first sensor tool side of the anchor user. As shown in FIG. 7, the method in the embodiment of the present disclosure may further include following steps.

Step S701: the terminal corresponding to the audience user transmits the target feedback data on the webcast of the anchor user.

Step S702: when receiving the target feedback data, the webcast server transmits the target feedback data to the terminal corresponding to the anchor user.

It should be appreciated that the webcast server may further transmit a response message to the terminal corresponding to the audience user, so that the terminal corresponding to the audience user may be informed that the webcast server receives the target feedback data.

Step S703: the terminal corresponding to the anchor user determines the first motion parameter of the virtual object corresponding to the anchor user according to the target feedback data.

As an example, a sensor plug-in in the terminal corresponding to the anchor user may determine the first motion parameter according to the target feedback data when detecting the target feedback data. The target feedback data may be transmitted by the webcast server to a browser in the terminal corresponding to the anchor user.

Step S704: the terminal corresponding to the anchor user controls the motion of the virtual object on the webcast screen according to the first motion parameter.

Step S705: the terminal corresponding to the anchor user transmits a first control instruction to the first sensor tool for the anchor user.

As an example, the first control instruction may include, but is not limited to, a pursuit motion parameter. The pursuit motion parameter may be the same as or may correspond to the first motion parameter.

Step S706: the first sensor tool for the anchor user moves according to the pursuit motion parameter.

It should be noted that the first sensor tool may also move with the virtual object according to the detected motion parameter when detecting the motion of the virtual object on the webcast screen in the terminal corresponding to the anchor user, and accordingly the terminal corresponding to the anchor user does not need to transmit the first control instruction to the first sensor tool.

In the embodiment of the present disclosure, the terminal corresponding to the anchor user determines first motion parameter of the virtual object corresponding to the anchor user according to the target feedback data, and the motion modes of the virtual object corresponding to the anchor user and the first sensor tool are controlled, so that the processing flow is much simpler, which is beneficial to improving the efficiency of controlling the motions of the first sensor tool and the virtual object.

Figure 8:
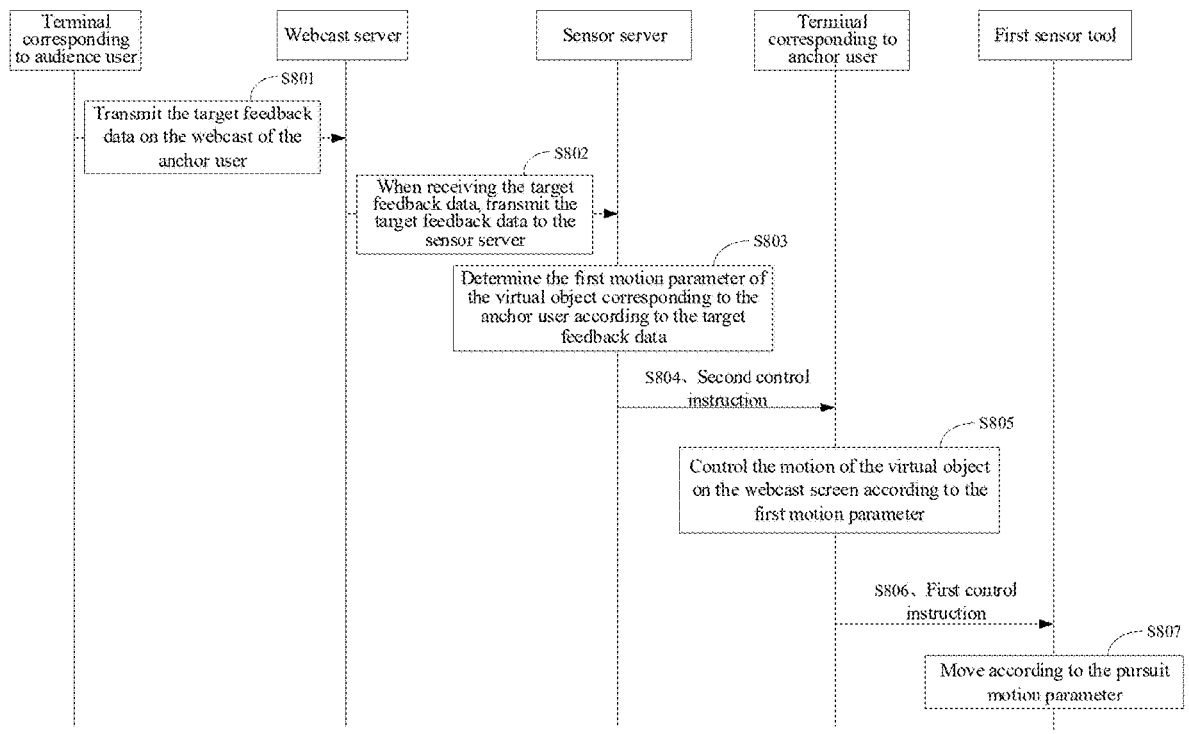
FIG. 8 is a flow chart of a webcast interaction method according to another embodiment of the present disclosure.

In an embodiment, FIG. 8 is a flow chart of a webcast interaction method. Based on the above embodiment, the webcast interaction method is elaborated in the embodiment of the present disclosure in combination with the terminal side corresponding to the audience user, the webcast server side, the sensor server side, the terminal side corresponding to the anchor user, and the first sensor tool side of the anchor user. As shown in FIG. 8, the method in the embodiment of the present disclosure may further include follow steps.

Step S801: the terminal corresponding to the audience user transmits the target feedback data on the webcast of the anchor user.

Step S802: when receiving the target feedback data, the webcast server transmits the target feedback data to the sensor server.

Step S803: the sensor server determines the first motion parameter of the virtual object corresponding to the anchor user according to the target feedback data.

Step S804: the sensor server transmits a second control instruction to the terminal corresponding to the anchor user.

As an example, the second control instruction may include, but is not limited to, the first motion parameter.

Step S805: the terminal corresponding to the anchor user controls the motion of the virtual object on the webcast screen according to the first motion parameter.

Step S806: the terminal corresponding to the anchor user transmits the first control instruction to the first sensor tool for the anchor user.

As an example, the first control instruction may include, but is not limited to, a pursuit motion parameter; the pursuit motion parameter may be the same as or may correspond to the first motion parameter.

Step S807: the first sensor tool for the anchor user moves according to the pursuit motion parameter.

In the embodiment of the present disclosure, the sensor server determines the first motion parameter of the virtual object corresponding to the anchor user according to the target feedback data, and the terminal corresponding to the anchor user controls the motion of the virtual object corresponding to the anchor user and the motion of the first sensor tool. The main processing flow is completed in the sensor server, so that the processing resource of the terminal corresponding to the anchor user can be saved, which is beneficial to improving the fluency of the webcast on the terminal corresponding to the anchor user.

Figure 9:
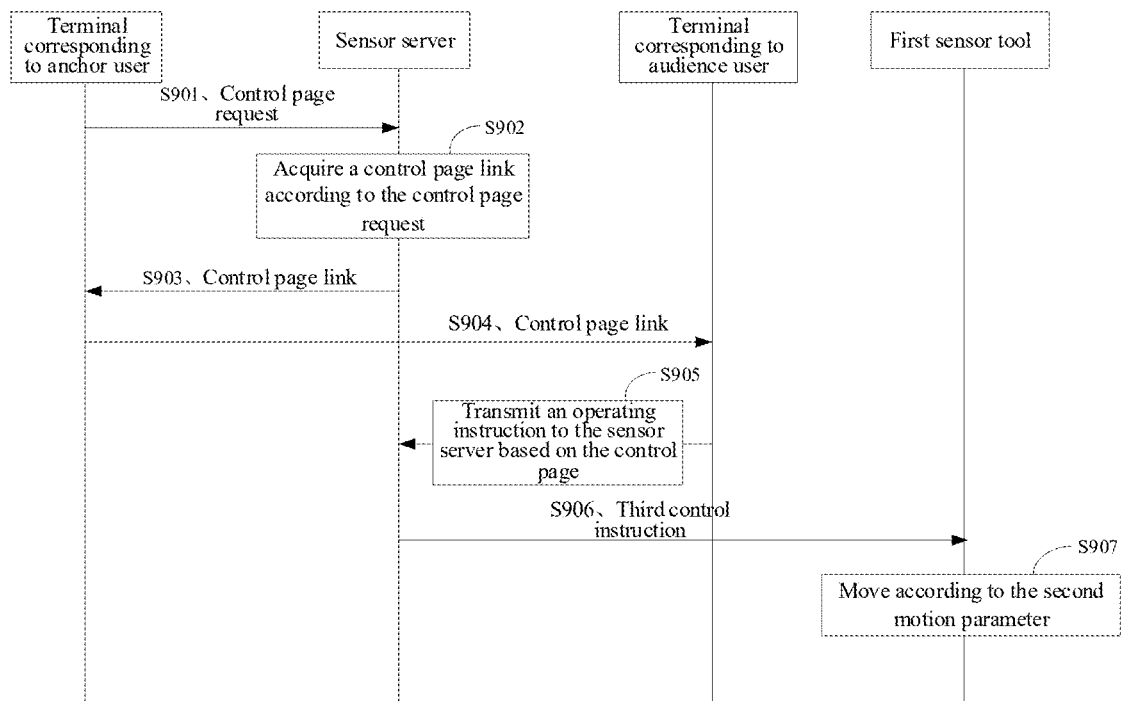
FIG. 9 is a flow chart of a webcast interaction method according to another embodiment of the present disclosure.

In an embodiment, FIG. 9 is a flow chart of a webcast interaction method. Based on the above embodiment, the webcast interaction method is elaborated in the embodiment of the present disclosure in combination with the terminal side corresponding to the audience user, the sensor server side, the terminal side corresponding to the anchor user, and the first sensor tool side of the anchor user. As shown in FIG. 9, the method in the embodiment of the present disclosure may further include the following steps.

Step S901: the terminal corresponding to the anchor user transmits a control page request to the sensor server.

Step S902: the sensor server acquires a control page link according to the control page request.

Step S903: the sensor server transmits the control page link to the terminal corresponding to the anchor user.

Step S904: the terminal corresponding to the anchor user transmits the control page link to the terminal corresponding to the audience user.

Step S905: the terminal corresponding to the audience user transmits an operating instruction to the sensor server based on the control page.

As an example, the operating instruction may include, but is not limited to, the second motion parameter.

Step S906: the sensor server transmits a third control instruction to the first sensor tool for the anchor user.

As an example, the third control instruction may include, but is not limited to, the second motion parameter.

Step S907: the first sensor tool for the anchor user moves according to the second motion parameter.

In the embodiment of the present disclosure, the control page link is transmitted to the terminal corresponding to the audience user according to the control page request, so that the terminal corresponding to the audience user can access the control page corresponding to the first sensor tool through the control page link, in order to control the motion of the first sensor tool corresponding to the anchor user, thereby further improving the interaction between the anchor user and the audience user, and further diversifying the interaction modes between the anchor user and the audience user.

Figure 10:
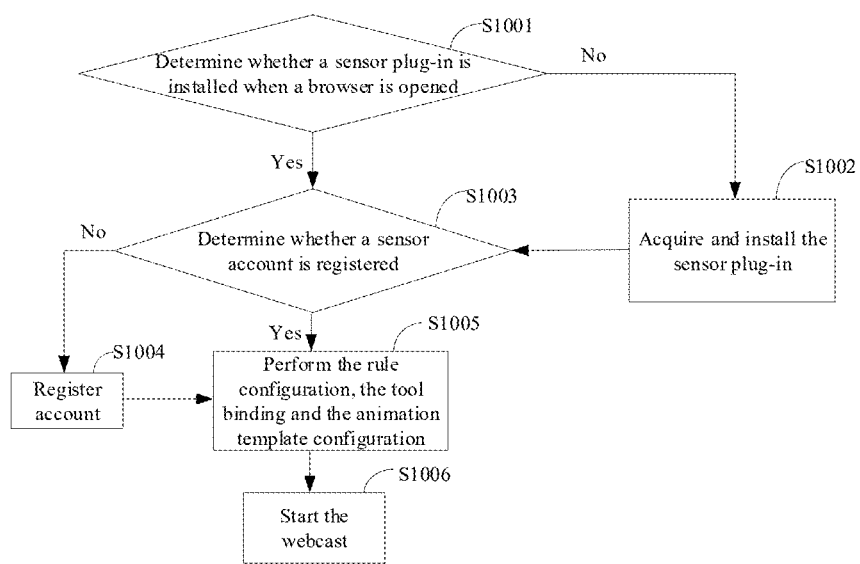
FIG. 10 is a flow chart of a webcast interaction method according to another embodiment of the present disclosure.

In an embodiment, FIG. 10 is a flow chart of a webcast interaction method. Based on the above embodiment, the related contents of the installation of plug-ins, account registration, rule configuration, tool binding and animation template configuration on the terminal corresponding to the anchor user before the webcast of the anchor user will be elaborated in an embodiment of the present disclosure below. As shown in FIG. 10, the method in the embodiment of the present disclosure may further include following steps.

Step S1001: the terminal corresponding to the anchor user determines whether a sensor plug-in is installed when a browser is opened.

When no sensor plug-in is installed, a step S1002 is performed. When the sensor plug-in is installed, a step S1003 is performed.

Step S1002: the terminal corresponding to the anchor user acquires and installs the sensor plug-in.

Step S1003: the terminal corresponding to the anchor user determines whether a sensor account is registered.

When no sensor account is registered, a step S1004 is performed; when a sensor account is registered, a step S1005 is performed.

Step S1004: the terminal corresponding to the anchor user registers an account.

As an example, the terminal corresponding to the anchor user may verify the mailbox verification code when receiving information inputted by the anchor user such as an account name, the mailbox verification code, and a password, etc. When the verification passes, the registration succeeds, and the terminal can be switched to a login status.

Of course, the terminal corresponding to the anchor user can register an account in other ways.

Step S1005: the terminal corresponding to the anchor user performs the rule configuration, the tool binding and the animation template configuration.

As an example, the terminal corresponding to the anchor user may perform the rule configuration, the tool binding, and the animation template configuration in parallel, or may perform the rule configuration, the tool binding, and the animation template configuration in sequence.

As another example, the terminal corresponding to the anchor user may perform any two of the rule configuration, the tool binding, and the animation template configuration in parallel, and then perform the remaining configuration in sequence.

It should be appreciated that the terminal corresponding to the anchor user can further display the binding result when connecting and bounding the first sensor tool to the terminal corresponding to the anchor user. For example, the first sensor tool is bound to the terminal corresponding to the anchor user, or the first sensor tool and the terminal corresponding to the anchor user are compatible with each other, and/or the first sensor tool is connected to the terminal corresponding to the anchor user, etc.

Step S1006: the terminal corresponding to the anchor user starts the webcast.

It should be noted that the terminal corresponding to the anchor user does not need to perform the above steps S1001 and S1002 when a sensor APP is opened.

It should be appreciated that although the various steps in the flow charts as described in the embodiments above are shown sequentially as indicated by the arrows, these steps are not definitely performed sequentially in the order indicated by the arrows. Unless specifically stated herein, the execution of these steps is not strictly limited in order, but these steps may be performed in other orders. Further, at least a portion of the steps in the flow charts as described in the embodiments above may include a plurality of steps or stages that may not definitely be performed at the same moment, but may be performed at different moments, and the steps or stages may not definitely be performed sequentially, but may be performed in turns or alternately with at least a portion of the steps or stages of other steps or other steps.

Figure 11:
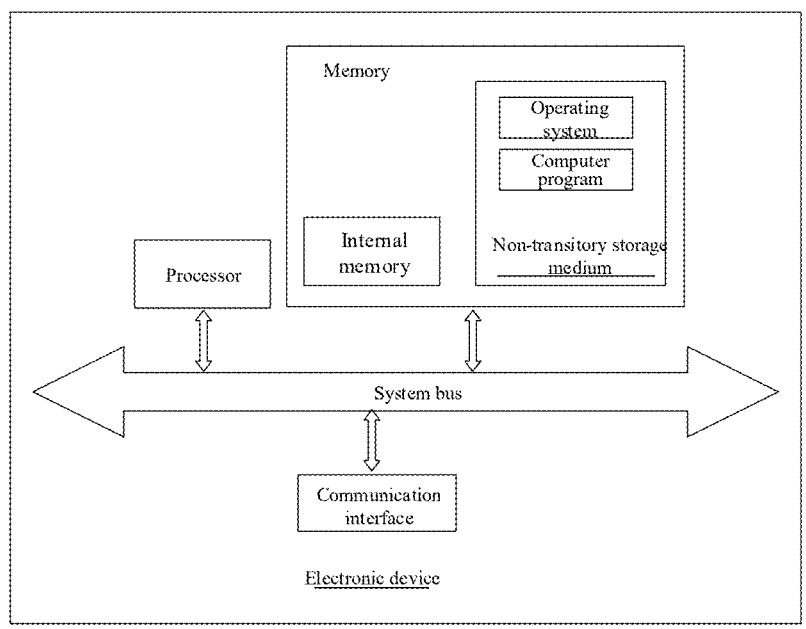
FIG. 11 is a schematic structure diagram of an electronic device according to other embodiments of the present disclosure.

In an embodiment, FIG. 11 is a schematic structure diagram of an electronic device in other embodiments of the present disclosure. As shown in FIG. 11, the electronic device provided by the embodiment of the present disclosure may include a processor, a memory, and a communication interface connected via a system bus. The processor of the electronic device is configured to provide computing and control capabilities. The memory of the electronic device includes a non-transitory storage medium and an internal memory. The non-transitory storage medium stores an operating system and a computer program. The memory provides an operating environment for the operating system and computer program in non-transitory storage media. The communication interface of the electronic device is configured to perform a wired or wireless communication with an external device. The processor, when executing the computer program, implements the technical scheme of the electronic device in the embodiment of the webcast interaction method described above, and has similar implementation principle and technical effect, which will not be repeated herein.

Those skilled in the art will appreciate that the structure shown in FIG. 11 is merely a block diagram of a portion of the structure associated with the technical solution of the present disclosure, and does not constitute a limitation to the electronic device to which the solution of the present disclosure is applied. The specific electronic device may include more or less components than those shown in the drawings, or may be combined with certain components, or may have different component arrangements.

In an embodiment, a webcast interaction system is further provided, which includes a first sensor tool for an anchor user and the electronic device provided in the above-mentioned embodiment. The electronic device is configured to:

acquire target feedback data of an audience user on a webcast of the anchor user, and determine a first motion parameter of a virtual object corresponding to the anchor user according to the target feedback data, in which the virtual object is displayed on a webcast screen; and control a motion of the virtual object on the webcast screen according to the first motion parameter to allow the first sensor tool for the anchor user to move with the virtual object.

The electronic device in the webcast interaction system provided by the embodiment of the present disclosure can be configured to implement the technical solution in the webcast interaction method embodiment described above with respect to the electronic device, and has similar implementation principle and technical effect as described above, which are not repeated herein.

In an embodiment, a computer-readable storage medium is further provided, on which a computer program is stored. When the computer program is executed by a processor, the technical solution in the webcast interaction method embodiment described above with respect to the electronic device is implemented. The computer-readable storage medium has similar implementation principle and technical effect as described above, which will not be repeated herein.

In an embodiment, a computer program product is further provided, which includes a computer program. When the computer program is executed by a processor, the technical solution in the webcast interaction method embodiment described above with respect to the electronic device is implemented. The computer program product has similar implementation principle and technical effect as described above, which are not repeated herein.

Those of ordinary skill in the art can understand that all or part of the procedures in the method of the above embodiments can be implemented by instructing relevant hardware through a computer program, and the computer program can be stored in a non-transitory computer-readable storage medium, when the computer program is executed, the procedures in the above-mentioned method embodiments can be performed. Any reference to a memory, a database or other media used in the various embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-transitory memory, a resistive memory (ReRAM), a magnetoresistive random access memory (MRAM), a ferroelectric random access memory (FRAM), a phase change memory (PCM), a graphene memory, etc. The transitory memory may include a random access memory (RAM) or an external cache memory, and the like. As an illustration and not a limitation, the RAM may be in various forms, such as a static random access memory (SRAM) or a dynamic random access memory (DRAM). The database involved in the various embodiments provided in the present disclosure may include at least one of a relational database and a non-relational database. The non-relational database may include a blockchain-based distributed database, etc., but is not limited thereto. The processor involved in the various embodiments provided in the present disclosure may be a general-purpose processor, a central processing unit, a graphics processor, a digital signal processor, a programmable logic device, a data processing logic device based on quantum computation, etc., but is not limited thereto.

It should be noted that the above-mentioned embodiments are merely used for illustrating the technical solution of the present disclosure, but should not be construed as a limitation on the scope of the present disclosure. Although the present disclosure is elaborated based on the aforementioned embodiments, those skilled in the art may still modify the technical solution described in the foregoing embodiments, or make equivalent substitutions for some or all of the technical features thereof, such modification or replacement shall not remove the essence of the corresponding technical solution from the scope of the technical solution in the embodiments of the present disclosure, which shall all fall within the scope of the claims and specifications of the disclosure. In particular, the technical features involved in the various embodiments may be combined in any manner provided that there is no structural conflict. The present disclosure is not limited to the specific embodiments disclosed herein, but includes all technical solutions falling within the scope of the claims.

What is claimed is:

1. An electronic device, comprising:
a processor and a memory for storing a computer program, the processor, when executing the computer program, implementing steps of:
acquiring target feedback data of an audience user on a webcast of an anchor user,
determining a first motion parameter of a virtual object corresponding to the anchor user according to the target feedback data, wherein the virtual object is displayed on a webcast screen, and wherein the determining the first motion parameter of the virtual object corresponding to the anchor user according to the target feedback data comprises:
determining an algorithm tool based on the target feedback data;
invoking the algorithm tool to generate an algorithm result; and
determining the first motion parameter according to the algorithm result; and
controlling a motion of the virtual object on the webcast screen according to the first motion parameter, to allow a first sensor tool for the anchor user to move with the virtual object.

2. The electronic device according to claim 1, wherein the determining the first motion parameter of the virtual object corresponding to the anchor user according to the target feedback data comprises:
querying the first motion parameter corresponding to the target feedback data in a first operation parameter pool according to the target feedback data, wherein the first operation parameter pool comprises corresponding relationships between various feedback data and motion parameters.

3. The electronic device according to claim 1, wherein the determining the first motion parameter according to the algorithm result comprises:
querying the first motion parameter corresponding to the algorithm result in a second operation parameter pool according to the algorithm result, wherein the second operation parameter pool comprises corresponding relationships between various algorithm results and motion parameters.

4. The electronic device according to claim 1, wherein the determining the first motion parameter according to the algorithm result comprises:
querying a candidate motion parameter corresponding to the target feedback data in the first operation parameter pool according to the target feedback data, wherein the first operation parameter pool comprises corresponding relationships between various feedback data and the motion parameters; and
adjusting the candidate motion parameter according to the algorithm result to obtain the first motion parameter.

5. The electronic device according to claim 1, wherein the processor, when executing the computer program, further implements the step of:
displaying the algorithm result on the webcast screen.

6. The electronic device according to claim 1, wherein the acquiring the target feedback data of the audience user on the webcast of the anchor user comprises:
acquiring feedback data of a plurality of audience users on the webcast of the anchor user at the same time; and
superposing the feedback data to obtain the target feedback data.

7. The electronic device according to claim 1, wherein the determining the first motion parameter of the virtual object corresponding to the anchor user according to the target feedback data comprises:
when detecting that a superposition result of the feedback data in the feedback data pool satisfies a special mode triggering condition, querying the first motion parameter corresponding to the target feedback data in a third operation parameter pool according to the target feedback data, wherein the feedback data pool stores feedback data of a plurality of audience users on the webcast of the anchor user, and wherein the third operation parameter pool comprises corresponding relationships between various feedback data and motion parameters.

8. The electronic device according to claim 1, wherein the processor, when executing the computer program, further implements steps of:
acquiring a control page request;
acquiring a control page link according to the control page request; and
returning the control page link, wherein the control page link is configured for a terminal corresponding to the audience user to access a control page corresponding to the first sensor tool.

9. The electronic device according to claim 8, wherein the processor, when executing the computer program, further implements steps of:
receiving an operating instruction triggered by the terminal corresponding to the audience user based on the control page, wherein the operating instruction comprises a second motion parameter; and
controlling the motion of the first sensor tool according to the second motion parameter.

10. The electronic device according to claim 2, wherein the processor, when executing the computer program, further implements steps of:
acquiring a rule configuration instruction; and
determining an operation parameter pool according to the rule configuration instruction, wherein the operation parameter pool comprises at least one of a first operation parameter pool, a second operation parameter pool, or a third operation parameter pool.

11. The electronic device according to claim 1, wherein the processor, when executing the computer program, further implements steps of:
acquiring a tool binding instruction; and
connecting and binding the first sensor tool to a terminal corresponding to the anchor user according to the tool binding instruction.

12. The electronic device according to claim 1, wherein the processor, when executing the computer program, further implements steps of:
acquiring an animation template instruction; and
acquiring an animation template of the virtual object according to the animation template instruction.

13. The electronic device according to claim 1, wherein the processor, when executing the computer program, further implements steps of:

controlling an operation of a second sensor tool corresponding to the audience user according to the first motion parameter.

14. The electronic device according to claim 1, wherein the target feedback data is feedback scale data determined according to original feedback data of the audience user on the webcast of the anchor user and preset base data.

15. A webcast interaction system, comprising a first sensor tool for an anchor user and the electronic device of claim 1, wherein the electronic device is configured to:

acquire target feedback data of an audience user on a webcast of an anchor user, and determine a first motion parameter of a virtual object corresponding to the anchor user according to the target feedback data, wherein the virtual object is displayed on a webcast screen, and wherein the determining the first motion parameter of the virtual object corresponding to the anchor user according to the target feedback data comprises:

determining an algorithm tool based on the target feedback data;

invoking the algorithm tool to generate an algorithm result; and determining the first motion parameter according to the algorithm result; and control a motion of the virtual object on the webcast screen according to the first motion parameter, to allow the first sensor tool for the anchor user to move with the virtual object.

16. A webcast interaction method, applied to the electronic device of claim 1, the method comprising:

acquiring target feedback data of an audience user on a webcast of an anchor user;

determining a first motion parameter of a virtual object corresponding to the anchor user according to the target feedback data, wherein the virtual object is displayed on a webcast screen, and wherein the determining the first motion parameter of the virtual object corresponding to the anchor user according to the target feedback data comprises:

determining an algorithm tool based on the target feedback data;

invoking the algorithm tool to generate an algorithm result; and determining the first motion parameter according to the algorithm result; and controlling a motion of the virtual object on the webcast screen according to the first motion parameter, to allow a first sensor tool for the anchor user to move with the virtual object.

17. A computer-readable storage medium, on which a computer program is stored, wherein when the computer program is executed by a processor, the steps of claim 1 are implemented.

18. A computer program product, comprising a computer-readable storage medium and a computer program stored on the computer-readable storage medium having executable instructions, wherein when the computer program is executed by a processor, the steps of claim 1 are implemented.

* * * * *